United States Patent
Parolini et al.

(10) Patent No.: US 12,434,718 B2
(45) Date of Patent: Oct. 7, 2025

(54) CONTROL OF AT LEAST ONE SAFETY FUNCTION OF A MOTOR VEHICLE

(71) Applicant: Bayerische Motoren Werke Aktiengesellschaft, Munich (DE)

(72) Inventors: Luca Parolini, Landshut (DE); Sebastian Schneider, Feldkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 196 days.

(21) Appl. No.: 18/271,701

(22) PCT Filed: Nov. 22, 2021

(86) PCT No.: PCT/EP2021/082414
§ 371 (c)(1),
(2) Date: Jul. 11, 2023

(87) PCT Pub. No.: WO2022/152435
PCT Pub. Date: Jul. 21, 2022

(65) Prior Publication Data
US 2024/0051552 A1    Feb. 15, 2024

(30) Foreign Application Priority Data
Jan. 12, 2021   (DE) .................. 10 2021 100 420.9

(51) Int. Cl.
*B60R 16/03*    (2006.01)
*B60W 50/00*   (2006.01)

(52) U.S. Cl.
CPC ......... *B60W 50/0098* (2013.01); *B60R 16/03* (2013.01); *B60R 16/0315* (2013.01)

(58) Field of Classification Search
None
See application file for complete search history.

(56) References Cited

U.S. PATENT DOCUMENTS

| 11,762,386 B1* | 9/2023 | Zhu .................... G05D 1/021 |
| | | 701/23 |
| 2014/0039649 A1 | 2/2014 | Wender et al. |
| 2020/0379430 A1 | 12/2020 | Doettling |
| 2021/0024092 A1* | 1/2021 | Han ................. B60L 3/0092 |

(Continued)

FOREIGN PATENT DOCUMENTS

| DE | 10 2012 218 361 A1 | 10/2013 |
| DE | 10 2012 015 272 A1 | 2/2014 |
| DE | 10 2014 224 665 A1 | 6/2016 |

(Continued)

OTHER PUBLICATIONS

International Search Report (PCT/ISA/210) issued in PCT Application No. PCT/EP2021/082414 dated Mar. 7, 2022 with English translation (5 pages).

(Continued)

*Primary Examiner* — James M McPherson
(74) *Attorney, Agent, or Firm* — Crowell & Moring LLP

(57) ABSTRACT

An apparatus for controlling at least one safety function of a motor vehicle is configured to determine a current driving situation of the motor vehicle, to determine a safety level required in the current driving situation of the motor vehicle, and to control the at least one safety function according to the required safety level.

9 Claims, 1 Drawing Sheet

(56) References Cited

U.S. PATENT DOCUMENTS

2022/0219733 A1 7/2022 Abdulkhaleq et al.

FOREIGN PATENT DOCUMENTS

| DE | 10 2017 205 495 A1 | 10/2018 |
| DE | 10 2017 208 505 A1 | 11/2018 |
| DE | 10 2019 206 026 A1 | 10/2020 |
| DE | 10 2019 114 854 A1 | 12/2020 |
| EP | 3 312 764 A2 | 4/2018 |
| WO | WO 2018/147872 A1 | 8/2018 |

OTHER PUBLICATIONS

German-language Written Opinion (PCT/ISA/237) issued in PCT Application No. PCT/EP2021/082414 dated Mar. 7, 2022 (7 pages).

German-language Search Report issued in German Application No. 10 2021 100 420.9 dated Sep. 1, 2021 with partial English translation (12 pages).

"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (two (2) pages).

"(R) Taxonomy and Definitions for Terms Related to Driving Automation Systems for On-Road Motor Vehicles", Surface Vehicle Recommended Practice, SAE (Society of Automotive Engineering) International, J3016TM, Sep. 2016, pp. 1-30 (30 pages).

\* cited by examiner

CONTROL OF AT LEAST ONE SAFETY FUNCTION OF A MOTOR VEHICLE

BACKGROUND AND SUMMARY OF THE INVENTION

The invention relates to an apparatus and a method for controlling at least one safety function of a motor vehicle.

In the context of the document, the term "automated driving" can be understood as meaning driving with automated longitudinal or lateral guidance or autonomous driving with automated longitudinal and lateral guidance. The term "automated driving" comprises automated driving with any desired degree of automation. Exemplary degrees of automation are assisted, partially automated, highly automated or fully automated driving. These degrees of automation were defined by the BASt (Bundesanstalt für Straßenwesen—Federal Highway Research Institute) (see BASt publication "Forschung kompakt", November 2012 edition). During assisted driving, the driver permanently carries out the longitudinal or lateral guidance, while the system performs the respective other function within certain limits. During partially automated driving, the system performs the longitudinal and lateral guidance for a certain period and/or in specific situations, in which case the driver must permanently monitor the system, like during assisted driving. During highly automated driving, the system performs the longitudinal and lateral guidance for a certain period without the driver having to permanently monitor the system; however, the driver must be able to assume the vehicle guidance in a certain time. During fully automated driving, the system can automatically manage driving in all situations for a specific application; a driver is no longer required for this application. The four aforementioned degrees of automation according to the definition by the BASt correspond to SAE levels 1 to 4 of the standard SAE J3016 (SAE—Society of Automotive Engineering). For example, highly automated driving according to the BASt corresponds to level 3 of the standard SAE J3016. SAE level 5 is also provided in SAE J3016 as the highest degree of automation, but is not included in the definition by the BASt. SAE level 5 corresponds to driverless driving, in which the system can automatically manage all situations like a human driver during the entire journey; a driver is generally no longer required.

It is known from the prior art that the operation of a motor vehicle may endanger persons and the environment. Safety functions for motor vehicles are therefore being developed in order to avoid these dangers. However, these safety functions require energy during operation of the motor vehicle, which increases the emissions emitted by the motor vehicle and/or reduces the range of the motor vehicle.

The object of the invention is to reduce the energy consumption of safety functions for motor vehicles.

The object is achieved by the features of the claimed invention. It is pointed out that additional features of a patent claim dependent on an independent patent claim can form, without the features of the independent patent claim or only in combination with a subset of the features of the independent patent claim, a separate invention which is independent of the combination of all features of the independent patent claim and can be made the subject matter of an independent claim, a divisional application or a subsequent application. This applies in the same manner to technical teachings described in the description that are able to form an invention independent of the features of the independent patent claims.

A first aspect of the invention relates to an apparatus for controlling at least one safety function of a motor vehicle.

The at least one safety function of the motor vehicle is, in particular, a function of the motor vehicle for detecting and/or reacting to faults, that is to say a dedicated function for detecting faults or reacting to detected faults, wherein a fault is a fault of an electrical and/or electronic subsystem or of a component of the motor vehicle. In this case, a fault is a deviation of the actual behavior of the subsystem or component from an intended behavior of the subsystem or component. Alternatively, the at least one safety function is a safety-critical customer function of the motor vehicle, that is to say a customer function which, if performed incorrectly, would endanger a person in the motor vehicle, a person in the area surrounding the motor vehicle or in the environment. Alternatively or additionally, the at least one safety function is an abstract safety concept which is implemented by way of a plurality of subfunctions, for example a multi-channel system in which a plurality of channels compute independently of one another and their results are then combined.

The apparatus is configured to determine a current driving situation of the motor vehicle, for example by way of sensors of the motor vehicle.

The apparatus is also configured to determine a safety level required in the current driving situation of the motor vehicle.

The safety level required in the current driving situation is, in particular, a safety requirement level ("Automotive Safety Integrity Level" ("ASIL")) for safety-relevant systems in motor vehicles that is specified by the ISO standard ISO 26262 ("Road vehicles—Functional safety"). In this case, there are the five safety requirement levels "QM", "ASIL A", "ASIL B", "ASIL C" and "ASIL D", where QM is the lowest level and ASIL D is the highest level.

Alternatively or additionally, the safety level required in the current driving situation is, in particular, a power level of at least one component of the motor vehicle, for example a sensor of the motor vehicle.

The apparatus is configured, for example, to determine the safety level required in the current driving situation of the motor vehicle by virtue of the apparatus holding the result of a danger and risk analysis to be carried out according to ISO 26262 during the development of the motor vehicle. This result indicates a required safety level for driving situations and states of the motor vehicle in the form of at least one required ASIL. Since the apparatus is configured to determine the current driving situation of the motor vehicle and is also able to determine the current state of the motor vehicle, the apparatus can use the result of the danger and risk analysis to determine, for this specific driving situation and the specific state of the motor vehicle, the safety level required in the current driving situation.

The safety level required in the current driving situation of the motor vehicle must itself be determined with the highest possible safety level.

The apparatus is also configured to control the at least one safety function on the basis of the required safety level.

In one advantageous embodiment of the invention, the apparatus is configured to determine a maximum safety level that can be achieved with the at least one safety function.

For this purpose, the apparatus is configured, for example, to provide the results of safety analyses which were carried out during the development of the motor vehicle and which assess, for example, the compliance with requirements from bands 4 ("Product development: system level"), 5 ("Product development: hardware level") and/or 6 (Product development: software level) of ISO 26262 by the at least one safety function.

The maximum safety level that can be achieved with the at least one safety function can be determined by determining a degree to which requirements of ISO 26262 are complied with.

If the required safety level is lower than the maximum safety level that can be achieved with the at least one safety function, the apparatus is also configured to control the safety function in such a manner that a safety level actually achieved with the at least one safety function reaches or exceeds the required safety level, and an actual energy consumption of the at least one safety function is lower than an energy consumption of the at least one safety function upon reaching the maximum safety level that can be achieved with the at least one safety function.

In particular, the apparatus is configured to implement this control by reducing the power of the at least one safety function, for example by reducing a sampling rate or a resolution or by deactivating a subfunction.

One advantage of this embodiment is that, despite complying with the safety level required in the current driving situation, the energy needed to perform the safety function is reduced and the motor vehicle is therefore operated in a more energy-efficient manner as a whole.

In a further advantageous embodiment of the invention, the apparatus is configured to deactivate the at least one safety function in order to control the at least one safety function on the basis of the required safety level.

In a further advantageous embodiment of the invention, the apparatus is configured to reduce a power of the at least one safety function, for example by reducing a sensor range and/or a sensor resolution of a sensor that provides an input signal for the safety function, in order to control the at least one safety function on the basis of the required safety level.

In a further advantageous embodiment of the invention, the at least one safety function is a multi-channel system architecture of a system of the motor vehicle, wherein the multi-channel capability is implemented using hardware and/or software, for example.

In this case, the apparatus is configured to deactivate at least one channel of the multi-channel system architecture of the system of the motor vehicle in order to control the at least one safety function on the basis of the required safety level. As a result, the resources needed for the calculation by the deactivated channel become available.

A further advantageous embodiment of the invention is a system for planning the resources of a motor vehicle, wherein the system comprises an apparatus described herein.

The system is configured to determine at least one resource of the motor vehicle that has become available, for example computing time that has become available and/or memory of a control device of the motor vehicle that has become available, by controlling the at least one safety function, and to plan the at least one resource of the motor vehicle that has become available.

In a further advantageous embodiment of the invention, the system is configured to plan the at least one resource that has become available by providing a driver assistance function for the motor vehicle with the at least one resource that has become available, wherein the driver assistance function is prevented from accessing longitudinal and/or lateral guidance of the motor vehicle.

In other words, the driver assistance function is operated in a so-called "shadow mode" in which, although the driver assistance function receives and processes input signals, it does not output any control signals to actuators of the motor vehicle.

This embodiment has the advantage that the driver assistance function can therefore be tested under real conditions without interfering with the operation of the motor vehicle. Therefore, a new version of the driver assistance system, which has not yet been made available to the driver of the motor vehicle, can be tested, for example, and discrepancies in the behavior between the new version and a previous version of the driver assistance function can be determined, for example.

In a further advantageous embodiment of the invention, the system is configured to plan the at least one resource that has become available by providing a driver assistance function with the resource, wherein the driver assistance function is controlled in such a manner that the operational design domain of the driver assistance function is expanded.

In this case, the operational design domain of the driver assistance function is a subset of all possible driving situations in which the driver assistance function operates with sufficient quality. For example, the operational design domain may limit a speed range of the motor vehicle in which the driver assistance function operates with sufficient quality. Alternatively or additionally, the operational design domain may restrict a complexity of an area surrounding the motor vehicle, for example if the driver assistance function operates with sufficient quality only in controlled freeway-like driving situations but not in highly complex, urban driving situations.

For some driver assistance functions, the operational design domain may in principle be expanded if resources are available. For example, with more available resources, more objects in the area surrounding the motor vehicle can be processed and/or more complicated image processing algorithms for identifying and/or classifying objects in the area surrounding the motor vehicle can be used.

In a further advantageous embodiment of the invention, the system is configured to plan the at least one resource that has become available by virtue of the system being configured to check a functionality of the resource, in particular by carrying out a functional test of the resource which cannot be carried out if the resource is being used, for example a memory test.

A second aspect of the invention relates to a method for controlling at least one safety function of a motor vehicle.

One step of the method is to determine a current driving situation of the motor vehicle.

A further step of the method is to determine a safety level required in the current driving situation of the motor vehicle.

A further step of the method is to control the at least one safety function on the basis of the required safety level.

The statements above with respect to the apparatus according to the invention in accordance with the first aspect of the invention accordingly also apply to the method according to the invention in accordance with the second aspect of the invention. Advantageous exemplary embodiments of the method according to the invention which are not explicitly described at this point and in the patent claims correspond to the advantageous exemplary embodiments of the apparatus according to the invention which have been described above or are described in the patent claims.

The invention is described below on the basis of an exemplary embodiment with the aid of the accompanying drawings.

DETAILED DESCRIPTION OF THE DRAWINGS

Figure 1:
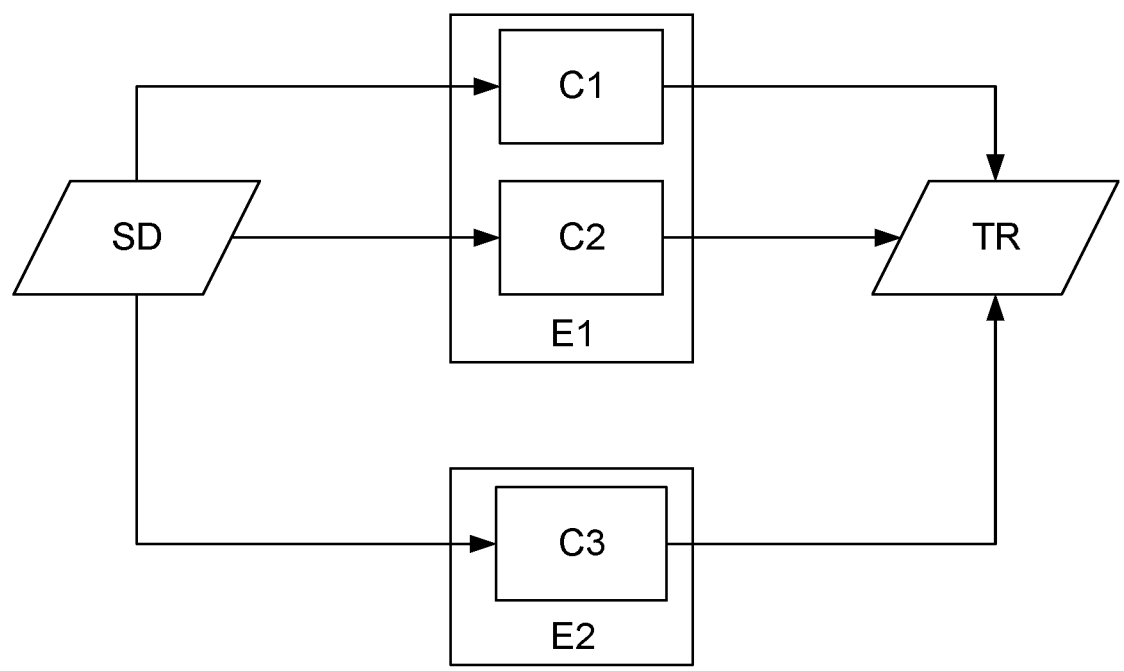
FIG. 1 shows an exemplary embodiment of the apparatus according to the invention.

FIG. 1 shows an apparatus according to an exemplary embodiment the invention for controlling at least one safety function of a motor vehicle.

The at least one safety function is a multi-channel system architecture C1, C2, C3 of a system of the motor vehicle.

In this case, sensor data SD are processed by three parallel processing channels C1, C2, C3, wherein the three parallel processing channels C1, C2, C3 are distributed over two control devices E1, E2 of the motor vehicle in such a manner that the two processing channels C1, C2 are implemented on the control device E1 and the processing channel C3 is implemented on the control device E3.

Trajectories TR which can be used to operate the motor vehicle in an automated manner are then determined, for example, from the results from the three parallel processing channels C1, C2, C3.

The apparatus is configured to determine 100 a current driving situation of the motor vehicle, to determine 150 a maximum safety level that can be achieved with the at least one safety function and to determine 200 a safety level required in the current driving situation of the motor vehicle.

If the required safety level is lower than the maximum safety level that can be achieved with the at least one safety function, the apparatus is also configured to control 300 the safety function in such a manner that a safety level actually achieved with the at least one safety function reaches or exceeds the required safety level, and an actual energy consumption of the at least one safety function is lower than an energy consumption of the at least one safety function upon reaching the maximum safety level that can be achieved with the at least one safety function.

In this case, the apparatus is configured to deactivate at least one channel of the multi-channel system architecture C1, C2, C3 of the system of the motor vehicle in order to control 300 the at least one safety function on the basis of the required safety level.

If, for example, the parallel redundant calculation by the processing channels C1 and C2 is carried out in order to achieve a safety objective which, in the event of a very critical driving situation of the motor vehicle, is assessed with a safety level of ASIL D, by dividing this safety level into two safety levels ASIL B(D) by way of ASIL decomposition, one of the two processing channels C1 and C2 can be deactivated if the safety objective is assessed only with a safety level of ASIL B in the current driving situation of the motor vehicle.

Alternatively or additionally, the processing channel C3, for example, is transferred to the control device E2 in order to prevent failure of all processing channels C1, C2, C3 on account of a common cause (so-called "common cause failure"), for example on account of a power failure of the control device E1.

If failure of all processing channels C1, C2, C3 can be tolerated in the current driving situation of the motor vehicle, for example because the motor vehicle is moving only at low speed and failure of the processing channels C1, C2, C3 can therefore be managed by any driver to be adopted, the processing channel C3 can be deactivated and possibly even the entire control device E2.

In particular, the motor vehicle comprises a system for planning the resources of the motor vehicle, wherein the system comprises the apparatus according to exemplary embodiments of the invention for controlling the at least one safety function of the motor vehicle.

The system is configured to determine 400 at least one resource of the motor vehicle that has become available by controlling the at least one safety function, and to plan 500 the at least one resource of the motor vehicle that has become available.

If, for example, the resources used for the calculation by the processing channel C2 on the control device E1 have become available because the processing channel C2 on the control device E1 has been deactivated, the system can plan 500 the at least one resource that has become available by providing a driver assistance function for the motor vehicle with the at least one resource that has become available, wherein the driver assistance system is prevented from accessing longitudinal and/or lateral guidance of the motor vehicle.

In other words, a driver assistance function can therefore be performed in the so-called "shadow mode" instead of the processing channel C2.

If, for example, the resources used for the calculation by the processing channel C3 on the control device E2 have become available because the processing channel C3 on the control device E2 has been deactivated, the system can plan 500 the at least one resource that has become available by virtue of the system being configured to check a functionality of the resource, for example by virtue of the system being configured to test the functionality of processors and/or memories of the control device E2 by way of a processor and/or memory test method.

Figure 2:
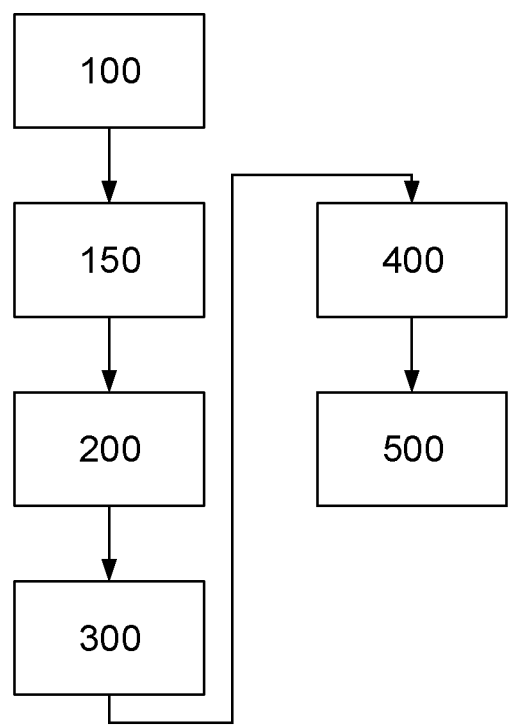
FIG. 2 shows an exemplary embodiment of the method according to the invention.

FIG. 2 shows an exemplary embodiment of a method for controlling at least one safety function of a motor vehicle.

One step of the method is to determine 100 a current driving situation of the motor vehicle.

A further step of the method is to determine 150 a maximum safety level that can be achieved with the at least one safety function.

A further step of the method is to determine 200 a safety level required in the current driving situation of the motor vehicle.

If the required safety level is lower than the maximum safety level that can be achieved with the at least one safety function, a further step of the method is to control 300 the safety function in such a manner that a safety level actually achieved with the at least one safety function reaches or exceeds the required safety level, and an actual energy consumption of the at least one safety function is lower than an energy consumption of the at least one safety function upon reaching the maximum safety level that can be achieved with the at least one safety function.

A further step of the method is to determine 400 at least one resource of the motor vehicle has become available by controlling the at least one safety function.

A further step of the method is to plan 500 the at least one resource of the motor vehicle that has become available.

The invention claimed is:
1. An apparatus for controlling at least one safety function of a motor vehicle, wherein the apparatus is configured:
to determine a current driving situation of the motor vehicle,
to determine a required safety level in the current driving situation of the motor vehicle,
to control the at least one safety function based on the required safety level,
to determine a maximum safety level that is achievable with the at least one safety function, and upon determining that the required safety level is lower than the maximum safety level that is achievable with the at least one safety function, to control the at least one safety function such that:
- a safety level actually achieved with the at least one safety function reaches or exceeds the required safety level, and
- an actual energy consumption of the at least one safety function is lower than an energy consumption of the at least one safety function upon reaching the maximum safety level that is achievable with the at least one safety function.

2. The apparatus according to claim 1, wherein the apparatus is further configured to deactivate the at least one safety function in order to control the at least one safety function based on the required safety level.

3. The apparatus according to claim 1, wherein the apparatus is further configured to reduce a power of the at least one safety function in order to control the at least one safety function based on the required safety level.

4. The apparatus according to claim 1, wherein:
- the at least one safety function is a multi-channel system architecture of a system of the motor vehicle, and
- the apparatus is further configured to deactivate at least one channel of the multi-channel system architecture of the system of the motor vehicle in order to control the at least one safety function based on the required safety level.

5. A system for planning resources of a motor vehicle, the system comprising:
- the apparatus according to claim 1, wherein the system is configured:
- to determine at least one resource of the motor vehicle that has become available by controlling the at least one safety function, and
- to plan the at least one resource of the motor vehicle that has become available.

6. The system according to claim 5, wherein the system is further configured to plan the at least one resource that has become available by providing a driver assistance function for the motor vehicle with the at least one resource that has become available, wherein the driver assistance function is prevented from accessing at least one of longitudinal or lateral guidance of the motor vehicle.

7. The system according to claim 5, wherein the system is further configured to plan the at least one resource that has become available by providing a driver assistance function with the at least one resource, wherein the driver assistance function is controlled such that an operational design domain of the driver assistance function is expanded.

8. The system according to claim 5, wherein the system is further configured to plan the at least one resource that has become available by virtue of the system being configured to check a functionality of the at least one resource.

9. A method for controlling at least one safety function of a motor vehicle, the method comprising:
- determining a current driving situation of the motor vehicle,
- determining a required safety level in the current driving situation of the motor vehicle,
- controlling the at least one safety function based on the required safety level,
- determining a maximum safety level that is achievable with the at least one safety function, and
- upon determining that the required safety level is lower than the maximum safety level that is achievable with the at least one safety function, controlling the at least one safety function such that:
  - a safety level actually achieved with the at least one safety function reaches or exceeds the required safety level, and
  - an actual energy consumption of the at least one safety function is lower than an energy consumption of the at least one safety function upon reaching the maximum safety level that is achievable with the at least one safety function.

* * * * *